United States Patent [19]

Holland et al.

[11] 4,204,690
[45] May 27, 1980

[54] SEALING RETAINING RING ASSEMBLY

[75] Inventors: Warren E. Holland, Houston; James D. Burley, Humble; Henry P. Arendt, Dallas, all of Tex.

[73] Assignee: Exxon Production Research Company, Houston, Tex.

[21] Appl. No.: 16,223

[22] Filed: Feb. 28, 1979

[51] Int. Cl.$^2$ .................. F16J 15/40; F16J 15/24
[52] U.S. Cl. ................................ 277/27; 277/30; 277/115; 277/117; 277/165; 277/190
[58] Field of Search .............. 277/3, 27, 30, 31, 115, 277/117–118, 121, 125, 165, 188 A, 188 R, 190, 191, 193, 216

[56] References Cited

U.S. PATENT DOCUMENTS

| | | | |
|---|---|---|---|
| 2,772,900 | 12/1956 | Campbell | 277/165 |
| 3,011,803 | 12/1961 | Buckner et al. | 277/165 X |
| 3,171,492 | 3/1965 | Cochran | 277/117 X |
| 3,606,356 | 9/1971 | Beroset | 277/165 |
| 3,865,387 | 2/1975 | Larker et al. | 277/190 |

FOREIGN PATENT DOCUMENTS

| | | | |
|---|---|---|---|
| 904906 | 7/1972 | Canada | 277/165 |
| 429749 | 6/1935 | United Kingdom | 277/115 |

Primary Examiner—Robert S. Ward, Jr.
Attorney, Agent, or Firm—John S. Schneider

[57] ABSTRACT

A sealing ring assembly is disclosed for use in sealing the annular gap between two concentric cylindrical members, one of the members having an annular groove and the other member having a surface opposed to the groove. Deformable seal material and a radially expansible-contractible non-deformable split retaining ring are located in the groove, the seal material engaging one surface of the retaining ring and the retaining ring being positioned on one of the sidewalls of the groove. The seal material and the retaining ring extend radially to the surface of the other cylindrical member, the retaining ring being sized to elastically compress against that surface. The surface of the retaining ring facing the seal material is beveled or chamfered along a portion or all of its width, the beveled surface extending inwardly to the inner edge of the retaining ring. Fluid pressure applied to the seal material deforms the seal material and causes the seal material to urge the outer edge of the retaining ring against the surface of the other cylindrical member. The seal material is deformed to press against the surface of the other cylindrical member to provide a primary seal. The inner edge of the retaining ring is, preferably, spaced from the inner wall of the groove and under pressure the seal material deforms and flows into the gap formed between the inner edge of the retaining ring and the inner wall of the groove to prevent leakage of fluid around the retaining ring.

6 Claims, 6 Drawing Figures

SEALING RETAINING RING ASSEMBLY

BACKGROUND OF THE INVENTION

The present invention concerns a sealing ring assembly for increasing the effectiveness of deformable O-rings and other deformable type seals for use as a sliding seal member, as for example a seal member on a piston or rod or as a stationary seal member, as for example a seal member on a well tubing to form a seal between that tubing and a larger concentric casing.

Deformable seal materials currently used as sliding fluid seals or stationary seals tend to extrude under high pressure, for example, 10,000 to 20,000 psi and high temperatures, e.g., 300° to 500° F. and will function properly only if the gap width (the space between the concentric cylindrical members) such materials must bridge is less than several thousandths of an inch. The seal material extrudes through any larger bridging gap width and may cause significant problems, as for example, in maintaining the seal and/or hindering or preventing removal of the retaining ring from its seal position and/or fouling of the cylindrical member and retaining ring associated with it. Fabrication tolerances, galling and parts assembly problems set practical limits on the dimensions of the retaining ring and seal material. Such limits do not permit a gap between the cylindrical members small enough to prevent extrusion of the seal material. The present invention uses a gap closing, radially expansible-contractible non-deformable split ring, having a portion or all of one of its surfaces tapered, to close that gap to about zero. Use of this ring prevents extrusion of the seal material while permitting practical fabrication tolerances for the assembly of the equipment and operation of the retaining ring.

SUMMARY OF THE INVENTION

The invention, briefly, resides in a sealing ring assembly for use in sealing the annular space between two concentrically arranged cylindrical members, one of the members having an annular groove and the other member having a surface opposed to such groove. Deformable seal material and a radially expansible-contractible non-deformable split retaining ring are located in the groove, the seal material engaging one surface of the retaining ring and the retaining ring being positioned on one of the side walls of the groove. The seal material and the retaining ring extend radially to the surface of the other member, the retaining ring being sized to elastically compress against that surface. The surface of the retaining ring facing the seal material is beveled or chamfered along at least part of its width. The chamfer extends inwardly to the inner edge of the retaining ring. Fluid pressure applied to the seal material causes the seal material to apply force to the beveled surface of the retaining ring and thereby press the retaining ring outwardly against the surface of the other cylindrical member to provide a seal and inhibit extrusion of the seal material. The inner edge of the retaining ring is, preferably, spaced from the inner wall of the groove such that under pressure the seal material deforms and flows into that space to prevent fluid pressure leaks around the inner edge of the retaining ring. The taper of the retaining ring also allows the seal material to seal against the inside edge of the retaining ring with minimum stretching and possible tearing of the seal material.

DESCRIPTION OF THE PREFERRED EMBODIMENTS

Figure 1:
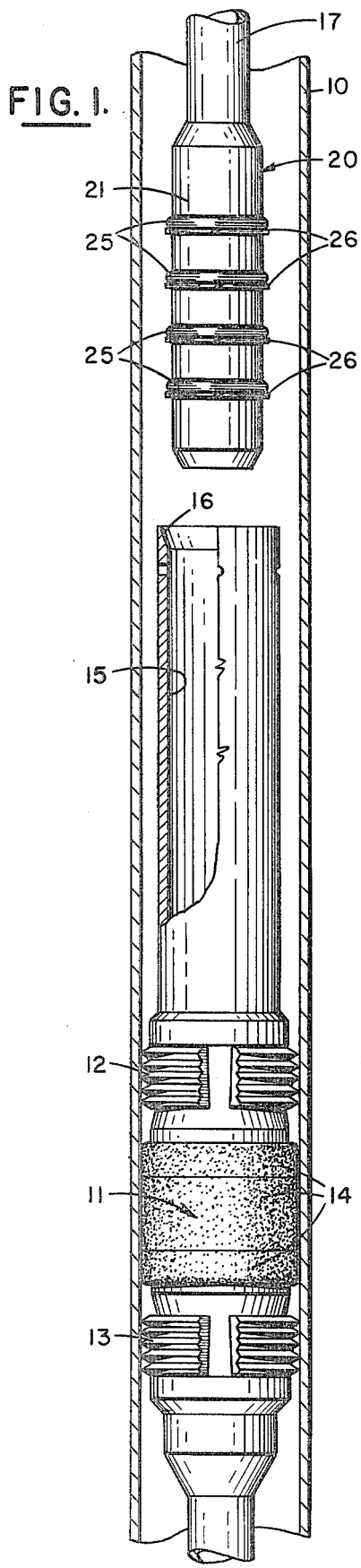
FIG. 1 illustrates use of the sealing ring assemblies of the invention with a tubing-well packer arrangement.
Figure 5:
FIG. 5 is a view of the retaining ring of the invention.

In FIG. 1 there is shown a casing or well pipe 10 in which a production packer 11 has been run and set. Packer 11 includes upper and lower slips 12 and 13, respectively, rings of resilient material 14, a tubular portion having a bore 15 and a tapered upper edge 16. The latter facilitates entry into the packer bore of a tubular member 17 to which is connected a tubing seal unit 20. The tubing seal unit includes a cylindrical member 21 on which are mounted four spaced-apart, deformable O-rings 25 formed of sealing material each of which is retained by a non-deformable radially expansible-contractible split ring 26 shown in greater detail in FIGS. 2 and 5. By deformable seal material is meant material which will deform and flow under fluid pressure. Such seal materials are resilient substances, reinforced plastics, thermoplastics or elastomers such as, for example, polybutyldiene acrylonitrile, polyisobutylene isoprene, chlorosulfonated polyethylene, epichlorohydrin, polyacrylic rubber, ethylene-propylene elastomer, etc., etc. The retaining ring is not deformable under fluid pressure and is preferably formed of metal or other rigid material.

Figure 2:
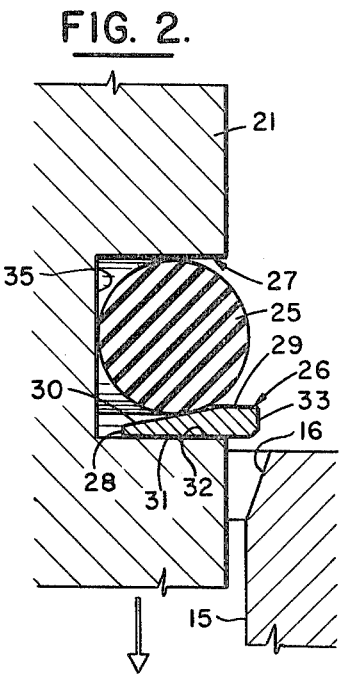
FIG. 2 is a fragmentary sectional view of one of the sealing ring assemblies shown in FIG. 1, as it is being lowered into sealing position within a well packer bore.
Figure 3:
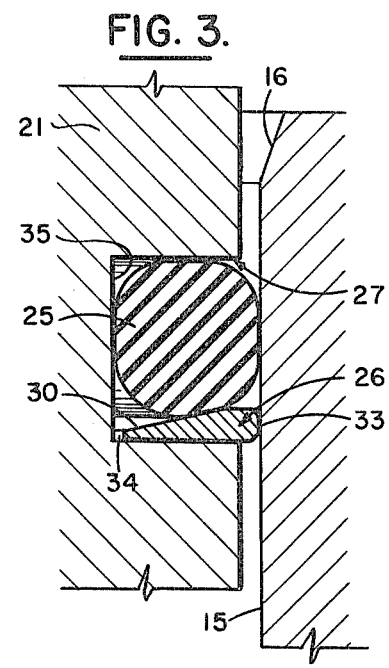
FIG. 3 is a fragmentary sectional view showing the sealing ring assembly positioned within the well packer bore prior to the application of fluid pressure.

Referring to FIG. 2, O-ring 25 and retaining ring 26 are shown positioned in a groove 27 formed in cylindrical member 21. A portion of the surface on one side 29 of a retaining ring 26, or the entire surface, is tapered inwardly towards the inner edge 28 of retaining ring 26, as indicated at 30. The flat surface of the other side 31 engages wall 32 of groove 27. Retaining ring 26 is sized so that in its relaxed condition the diameter of retaining ring 26 is slightly larger than the diameter of packer bore 15. Once within packer bore 15, as shown in FIG. 3, retaining ring 26 is elastically compressed against the wall of the packer bore 15 to leave no gap between the outer edge 33 of retaining ring 26 and the wall of packer bore 15 opposite groove 27. In that position of retaining ring 26 an annular space or gap 34 exists between the inner edge 28 of retaining ring 26 and the inner wall 35 of groove 27. O-ring 25 in that position is deformed by and in contact with the wall of packer bore 15. The uncut metallic retaining ring is sized, also, such that when cut and retracted to the internal diameter of bore 15 the split, which can be a scarf cut 27a will have no gap or overlap.

Figure 4:
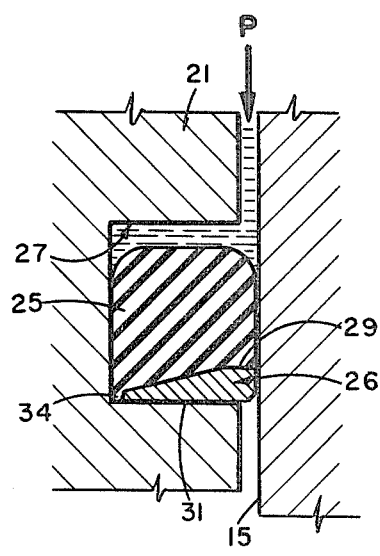
FIG. 4 is a fragmentary sectional view showing the seal unit of FIG. 3 after the application of fluid pressure.
Figure 6:
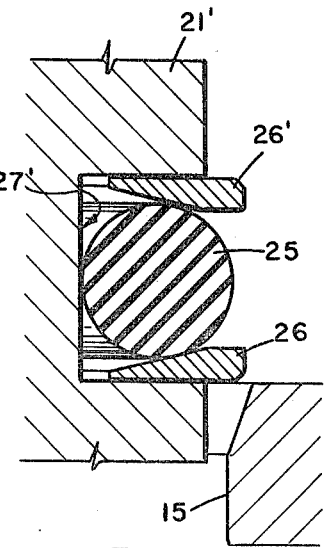
FIG. 6 is a fragmentary sectional view showing a modified seal unit in the position illustrated in FIG. 2.

As seen in FIG. 4 fluid pressure (P) applied against O-ring 25 further deforms the O-ring causing the O-ring material to flow and fill the space adjacent surface 29 of retaining ring 26, fill gap 34 and press or urge retaining ring 26 against the wall 15 of the packer bore. The taper or chamfer 30 facilitates nondestructive extrusion of the O-ring material into gap 34. The deformable O-ring 25 is retained and used as a primary seal by pressure actuation and only one retaining ring 26 is necessary to effect the seal if pressure is applied from only one direction. However, as illustrated in FIG. 6 one retaining ring may be located on each side of O-ring 25. The other retaining ring 26' functions to effect the seal, in the same manner retaining ring 26 functions and effects the seal, when pressure is applied from the opposite direction to that shown in FIG. 4. The operation of the metallic seal ring assembly has been illustrated to show confining an O-ring as a packer seal; however, other applications are within the scope of the present invention. The seal ring assembly is applicable to sealing between any two cylindrical concentric members whether both members are stationary as in the embodiment illustrated herein or where one of the cylindrical members is a reciprocating piston or movable rod and the retaining ring assembly is a sliding seal.

Various modifications may be made in the embodiments of the invention described herein without departing from the spirit of the invention as defined in the appended claims.

Having fully described the apparatus, objects, advantages and operation of our invention we claim:

1. An assembly for sealing between two concentric cylindrical members comprising:
    an annular groove formed on one of said cylindrical members, said groove containing seal material in contact with the surface of the other cylindrical member opposing said groove and an expansible-contractible split metallic retaining ring extending radially to the surface of said other cylindrical member and having at least a portion of the surface on one side beveled inwardly to the inner edge of said retaining ring, the surface on the opposite side engaging one of the side walls of said groove, said retaining ring being sized to elastically compress against the wall of said other cylindrical member to leave no gap between the outer edge of said retaining ring and the opposing wall of said other cylindrical member.

2. An assembly as recited in claim 1 in which the inner edge of said retaining ring is spaced from the inner wall of said groove.

3. An assembly as recited in claim 2 including another expansible-contractible split metallic retaining ring extending radially to the surface of said other cylindrical member and having at least a portion of one surface beveled inwardly to the inner edge of said retaining ring, the surface on the opposite side engaging the other side wall of said groove, said retaining ring being sized to elastically compress against the wall of said other cylindrical member to leave no gap between the outer edge of said retaining ring and the opposing wall of said other cylindrical member.

4. In an assembly for sealing between two concentric cylindrical members, one of which contains an annular groove comprising:
    seal material adapted to be contained in said groove and for contact with the surface of said other cylindrical member opposing said groove; and
    an expansible-contractible split metallic retaining ring adapted to be contained in said groove and extendible radially to the surface of said other cylindrical member and having at least a portion of the surface on one side thereof beveled inwardly to the inner edge of said retaining ring, the surface on the opposite side thereof being engageable with one of the side walls of said groove, said retaining ring being sized to elastically compress against the wall of said other cylindrical member to leave no gap between the outer edge of said retaining ring and the opposing wall of said other cylindrical member when said assembly is in sealing position.

5. An assembly as recited in claim 4 in which the inner edge of said retaining ring is spaced from the inner wall of said groove when said assembly is in sealing position.

6. An assembly as recited in claim 5 including another expansible-contractible split metallic retaining ring adapted to be contained in said groove and extendible radially to the surface of said other cylindrical member and having at least a portion of the surface on one side thereof beveled inwardly to the inner edge of said retaining ring, the surface on the opposite side thereof being engageable with the other side wall of said groove, said retaining ring being sized to elastically compress against the wall of said other cylindrical member to leave no gap between the outer edge of said retaining ring and the opposing wall of said other cylindrical member when said assembly is in sealing position.

* * * * *